United States Patent [19]

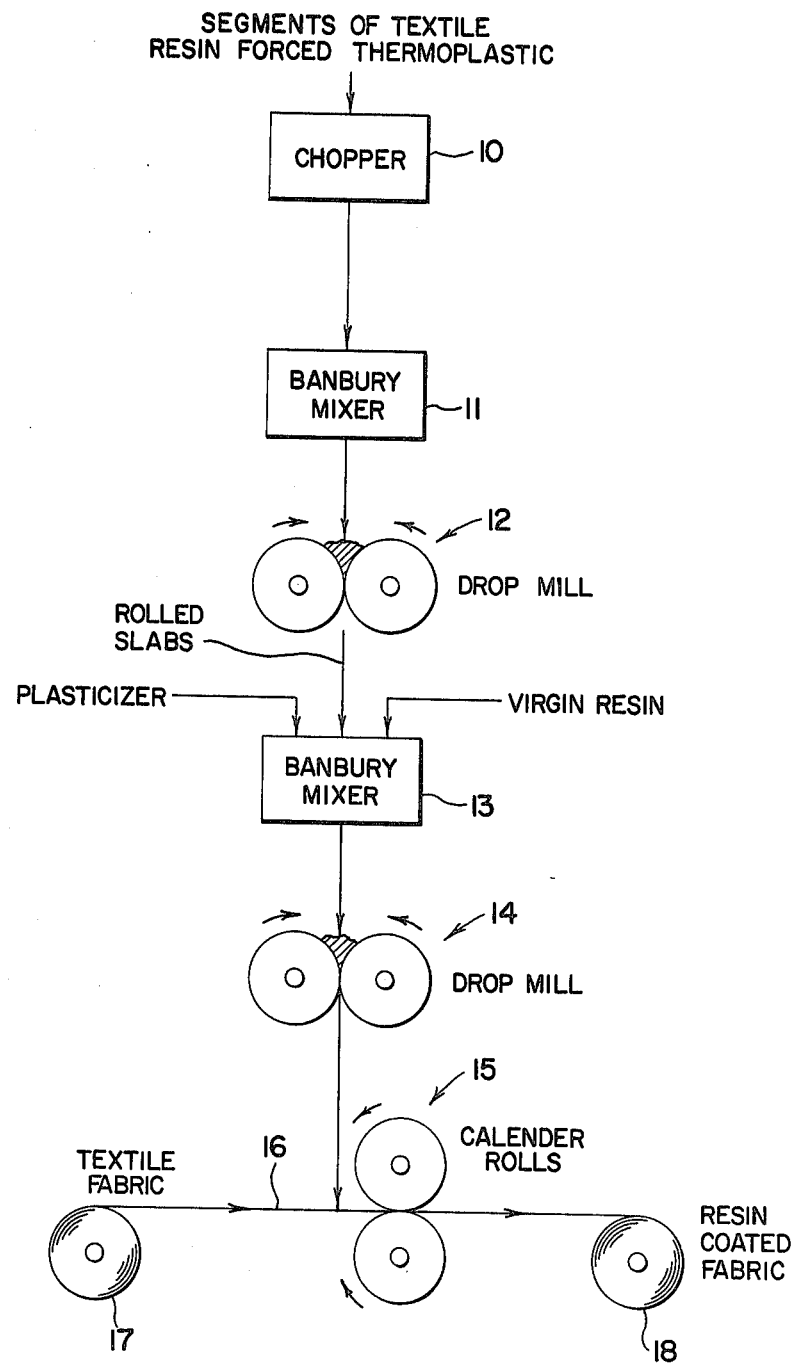

Benkowski et al.

[11] 4,158,646

[45] Jun. 19, 1979

[54] METHOD FOR REPROCESSING SCRAP FROM FABRIC REINFORCED THERMOPLASTIC SHEET

[75] Inventors: William J. Benkowski, Jeannette, Pa.; Richard L. Fishel, Akron; Francis J. Maurer, Tallmadge, both of Ohio

[73] Assignee: The General Tire & Rubber Company, Akron, Ohio

[21] Appl. No.: 677,102

[22] Filed: Apr. 15, 1976

Related U.S. Application Data

[63] Continuation of Ser. No. 574,198, May 5, 1975, abandoned, which is a continuation of Ser. No. 451,390, Mar. 15, 1974, abandoned, which is a continuation of Ser. No. 310,503, Nov. 29, 1972, abandoned.

[51] Int. Cl.² .................. B29B 1/04; B29C 29/00; B02C 17/00
[52] U.S. Cl. .................. 260/2.3; 260/17.4 R; 264/37; 264/68; 264/174; 264/257; 264/349
[58] Field of Search .................. 264/37, 68, 126, 140, 264/349, DIG. 53, DIG. 69, 257, 174; 260/2.3, 17.4 R

[56] References Cited

U.S. PATENT DOCUMENTS

| | | | |
|---|---|---|---|
| 2,558,378 | 6/1951 | Petry | 260/31.6 |
| 3,531,562 | 9/1970 | Serrano et al. | 264/37 |
| 3,535,408 | 10/1970 | Ronden | 264/37 |
| 3,562,373 | 2/1971 | Logrippo | 264/37 |
| 3,806,562 | 4/1974 | Lamort et al. | 264/140 |

*Primary Examiner*—James B. Lowe

[57] ABSTRACT

A method for reclaiming scrap produced in the manufacture of fabric reinforced thermoplastic resin sheet material so that the scrap may be worked, banded and calendered or extruded to form a finished product. The reclaiming or reworking of the material is made possible by first tearing the fabric fibers embedded in the thermoplastic resin into discrete finite lengths, mixing the resulting fibers and resin and forming the mixture into a new sheet of thermoplastic resin material suitable for many commercial uses. The tearing of the textile fibers embedded in the scrap into minute lengths is accomplished by applying shearing force to the opposite surfaces of the segments of scrap, in directions parallel to the surfaces. This is accomplished, for example, in a Banbury mixer or in a tight cold mill. The shearing force causes stretching and ultimate rupturing and tearing of the fibers progressively throughout the entire surface area of the scrap segment. The fibers in the resulting mixture are of minute length and are normally not visible in the resulting finished product.

1 Claim, 1 Drawing Figure

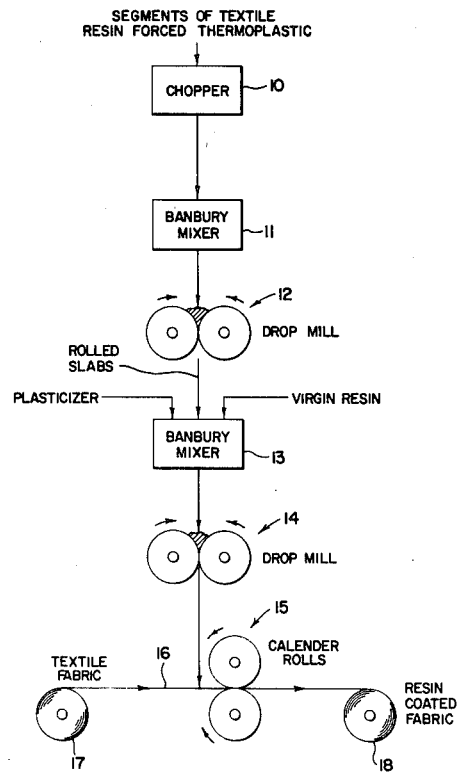

METHOD FOR REPROCESSING SCRAP FROM FABRIC REINFORCED THERMOPLASTIC SHEET

This is a continuation of application Ser. No. 574,198 filed May 5, 1975, which is a continuation of Ser. No. 451,390 filed Mar. 15, 1974, which is a continuation of Ser. No. 310,503 filed Nov. 29, 1972 all of which are now abandoned.

BACKGROUND OF THE INVENTION

This invention relates to the manufacture of thermoplastic resin sheet material such as vinyl coated fabrics, expanded vinyl sheet and other plastic roll goods. More particularly, the invention relates to the reclaiming or reprocessing of scrap material produced in the manufacture of various plastic roll goods, especially scrap that contains reinforcing textile fabric.

Enormous amounts of scrap are generated during the manufacture of textile fabric reinforced thermoplastic resin sheet material (hereinafter "reinforced sheet"). This scrap includes, for example, selvedge trim—strips trimmed from the sides of a long sheet to eliminate edge irregularities and to provide the desired lateral dimension. This scrap is difficult to dispose of and usually requires the services of an industrial waste contractor. This service is costly, particularly because space for such disposal is increasingly difficult to find.

While thermoplastic sheet material that has no textile fabric reinforcement may be readily reprocessed merely by mixing the scrap with virgin material and processing it according to standard practices, these same techniques cannot be readily adapted to scrap from reinforced sheet because of the fabric backing. The woven fibers prevent the material from banding on a mill and thus it cannot be calendered.

Certain methods have been developed for reprocessing scrap from reinforced sheet by chopping it into small pieces and then removing altogether a substantial amount of the textile fibers, such as by a vacuum process as disclosed in U.S. Pat. No. 3,562,373 of Logrippo. These methods are costly and time-consuming, however, and they in turn also produce scrap in the form of the removed textile fibers that must be disposed of. Accordingly, they are not feasible from an economic point of view and do not completely eliminate the problem of disposal.

The method of the present invention, however, reduces the difficulties indicated above and affords other features and advantages heretofore not obtainable.

SUMMARY OF THE INVENTION

It is among the objects of the invention to reprocess scrap produced during the manufacture of reinforced sheet.

Another object is to eliminate the need for disposal of scrap produced during the manufacture of reinforced sheet.

Still another object is to break down fibers of the fabric contained in scrap produced in the manufacture of reinforced thermoplastic sheet into discrete finite lengths sufficiently small that the fiber-containing scrap can be banded and calendered or extruded so as to facilitate the reprocessing thereof into commercial products.

Other objects and advantages are accomplished according to the method of the invention by applying a shearing force parallel to the surfaces of segments of scrap of the type described above so as to rupture and tear the fabric fibers into lengths no greater than about 0.25 inch. This forms a mixture of thermoplastic resin and short lengths of fabric fibers. The resulting mixture is subjected to heat and pressure, such as by a drop mill and thus banded.

The application of shearing force can be accomplished, for example, in a Banbury mixer or in a tight cold mill.

After the mixture is banded as described, it can be calendered onto a web of fabric to form a finished reinforced sheet or extruded into various continuous forms such as sheets or strips.

The invention is particularly useful as applied to scrap polyvinyl chloride sheet material reinforced with cotton fabric. However, it can also be used advantageously with such sheet material reinforced with polyester or other fabric, woven or non-woven, including glass fiber matting.

In accordance with one embodiment of the invention, the banded mixture is mixed with virgin resin and plasticizer before being calendered or extruded to form the final product.

BRIEF DESCRIPTION OF THE DRAWINGS

FIG. 1 is a schematic diagram in block form illustrating a preferred method embodying the invention for reprocessing scrap derived from the manufacture of reinforced sheet.

DESCRIPTION OF THE PREFERRED EMBODIMENT

As indicated above, the successful reprocessing of scrap produced during the manufacture of reinforced sheet is accomplished in accordance with the invention by applying shearing force to opposite surfaces of a segment of scrap progressively throughout the entire surface area thereof in such a way as to progressively tear the fabric into discrete fibers of finite length. The scrap segments come from a calendered trim station or from a jet-oven trim station; and while this scrap can be worked directly from its original form, it is preferable that it be cut or chopped into small pieces to facilitate handling.

The preferred form of the process is illustrated in FIG. 1 wherein it will be seen that the scrap is initially delivered to a chopper 10. The chopping or cutting operation should be performed in such a way as to avoid tearing the strands or yarns apart so that the bulk density is not increased due to the development of lint or "fuzz balls."

The chopped scrap is then delivered to a Banbury mixer 11 of the type well known to those skilled in the art. Due to the heat produced in the operation, the Banbury should be provided with sufficient cooling capability. While a Banbury mixer is shown in the embodiment of the invention described herein, the operation can be performed on a tight cold mill as well or on a standard rubber refining mill. A working time of from 1 to 5 minutes in a tight cold mill or in a Banbury is usually sufficient to produce a mixture wherein the fibers are sufficiently ruptured and torn into minute lengths small enough to permit the product to be calendered or extruded. In a tight cold mill the gap should be set at between 0.015 and 0.025 inch. While only one minute's working time is sufficient to break down the fibers to the point that the mixture may be banded and calendered, further working for up to 20 minutes will give a maximum fiber breakdown resulting in optimum surface appearance in the resulting product.

The temperature in the Banbury or the tight cold mill should be carefully controlled in order to achieve the optimum rupturing and tearing of the fibers. If the temperature is too high, the working merely strips the coating off the fabric without rupturing or tearing the fabric. The best fiber breakdown is accomplished where the Banbury jacket temperature is maintained at 90° F. However, satisfactory working can be achieved with a 140° F. jacket temperature. Tests conducted with a jacket temperature of 210° F. indicated poor fiber breakdown and produced a mixture after several minutes' working that could not be banded. Where higher jacket temperatures are used, sufficient mixing times cannot be achieved due to the excessive temperature buildup in the scrap being worked.

The mixture of resin and finite fiber particles from the Banbury mixer 11 is delivered to a drop mill 12 of the type well known in the art wherein a pair of rolls are closely spaced from one another and turned to squeeze the material therebetween and feed out slabs of rolled and banded material.

In accordance with the preferred embodiment illustrated in FIG. 1, the rolled slabs from the drop mill 12 are delivered to a second Banbury mixer 13 and mixed with a quantity of virgin resin and plasticizer. It should be noted that this step is not essential to the practice of the invention and that the rolled slabs from the drop mill 12 can be extruded or calendered without further modification depending upon the product desired. The addition of virgin resin and plasticizer, however, achieves somewhat improved results. Also, unsupported scrap can be added to the Banbury mixer 13, i.e., scrap from thermoplastic resin sheet material that has not been reinforced with textile fabric. The plasticizer added to the Banbury mixer 13 can be, for example, di-2-ethylhexyl phthalate or the like. Other thermoplastic resins that may be added include acrylic copolymers, acrylo-butadiene-styrene, poly alpha methyl styrene or styrene copolymers. From the Banbury mixer 13 the resulting mixture is delivered to another drop mill 14 which performs the same function as the drop mill 12 and delivers rolled or banded slabs.

The slabs from the drop mill 14 are delivered, for example, to a calender station wherein calender rolls 15 are used to coat a web 16 of textile fabric that is fed from a reel 17, passed between the calender rolls 15 to apply the resin, and rolled on a take-up reel 18.

The method of the invention achieves its best results with reinforced sheet wherein the fiber content is between 10 and 30 percent by weight. However, almost any reinforced sheet can be reprocessed according to the invention. Where the fiber content exceeds 30 percent by weight, certain difficulties are encountered in handling during breakdown of the fibers due to insufficient binder. This can result in a discontinuous sheet or slab being fed from the drop mill. This difficulty can be resolved by reducing the amount of fiber content by weight by mixing in with the high-fiber-content material a material having a much lower fiber content to achieve an optimum level of 20 percent or less. An alternate method would be to mix in unsupported scrap or virgin resin as described above in order to achieve the optimum fiber content.

While FIG. 1 describes a specific application of the invention wherein the banded mixture of fibers and resin is calendered onto a web 16 of textile fabric, in some circumstances the banded mixture can be extruded. Current indications are that the fiber content of a banded mixture for use in extruding applications is about 20 percent.

While the invention can be used in connection with many types of thermoplastic resins, its use in connection with reinforced polyvinyl chloride sheet material appears to be the most advantageous at the present time. The types of vinyl products that can be made from the scrap produced in the manufacture of reinforced vinyl sheet include matting of all types, automobile carpet underlay, substrates for vinyl coatings, boat decking, Landau sheeting, wall coverings and deeply embossed sheeting for many applications. While the textile fabric most often used to reinforce vinyl sheet material is cotton fabric, other fabrics both woven and non-woven, are included within the scope of the method of the invention. Also, in addition to the solid-type vinyl sheeting, it has been found that expanded vinyl sheet, either reinforced or unreinforced, can also be produced from reinforced vinyl sheet scrap. The scrap that has been worked in accordance with the invention has the unique property of being processible at the low calender temperatures necessary to prevent decomposition of the blowing agent used in the manufacture of expanded vinyl sheeting. Production of expanded vinyls greatly enlarges the potential for use of the invention.

The invention may be better understood by referring to the following examples that are representative of applications of the method of the invention.

EXAMPLE I

Scrap from vinyl sheet material reinforced with cotton fabric comprising about 18% by weight of the product was worked in accordance with the invention on a cold tight rubber refining mill for about 2 minutes. The resulting mixture of minute fibers and vinyl was then processed in separate portions according to three different procedures. In the first instance, the mixture was simply banded and calendered into an unsupported sheet. In the second instance, the mixture was mixed in a second Banbury pass with vinyl scrap from unsupported vinyl sheet to produce a composite mixture of 80% by weight of the fiber-vinyl mixture and 20% by weight of the unsupported vinyl scrap. The composite mixture was then banded and calendered as described above. In the third instance, the mixture of minute fibers and vinyl was mixed in a second Banbury pass with vinyl scrap from unsupported vinyl scrap to produce a composite mixture of 67% by weight of the fiber-vinyl mixture and 33% by weight of the unsupported vinyl scrap. The composite mixture was then banded and calendered as described above. Finally, a quantity of the vinyl scrap from the unsupported vinyl sheet was banded and calendered in the same manner.

The four finished vinyl sheet products were each subjected to physical tests for tensile strength, elongation (%), Graves tear strength, and abrasion resistance using a CS17 abrasion wheel set at 1000 cpm and at a 1000 gm load. The tests were conducted according to procedures well known in the art and the results are set forth in Table I below.

TABLE I

| Portions | Tensile Strength (psi) | Elongation (%) | Graves Tear (lb/in.) | Abrasion (gm. wt. Loss) |
|---|---|---|---|---|
| 100% reinforced | 1235/823 | 9/23 | 186/233 | .089 |

TABLE I-continued

| Portions | Tensile Strength (psi) | Elongation (%) | Graves Tear (lb/in.) | Abrasion (gm. wt. Loss) |
| --- | --- | --- | --- | --- |
| scrap 80% reinforced scrap 20% unsupported scrap | 968/818 | 131/192 | 149/243 | .068 |
| 67% reinforced scrap 33% unsupported scrap | 1142/735 | 178/300 | 239/247 | .053 |
| 100% unsupported scrap | 1916/1811 | 519/545 | 220/230 | .022 |

EXAMPLE II

The second run of Example I was repeated in a production plant except that the composite mixture of 80% by weight of the fiber-vinyl mixture and 20% by weight of the unsupported vinyl scrap was calendered onto fabrics. The finished vinyl sheet products were subjected to the same physical tests for tensile strength, elongation and Graves tear strength with the following results:

TABLE II

| Fabric | Tensile Strength (psi) | Elongation (%) | Graves Tear (lb/in.) |
| --- | --- | --- | --- |
| Knit | 1430/530 | 34/170 | 235/145 |
| Drill | 1880/1300 | 11/18 | 193/163 |

EXAMPLE III

Scrap from reinforced vinyl sheet having a fiber content by weight of about 20% was worked in a cold tight mill having a gap setting of between 0.015 and 0.020 inch for about 5 minutes and the resulting mixture of fibers and vinyl was mixed with unsupported vinyl scrap to form a composite mixture comprising 80% by weight of fiber and vinyl mixture and 20% by weight of unsupported scrap. The resulting composite mixture was placed on a drop mill (at a temperature of about 280° F.) and banded.

Azodicarbonamide 

a blowing agent sold commercially under the trade designation "KEMPORE SD-125," was added in a portion of 4 pph and processed for 5 minutes. A portion of the resulting product was expanded in a press to form an expanded vinyl product. The resulting expanded vinyl sheet was then measured for thickness and subjected to physical tests for tensile strength, elongation, and trapezoid tear. The test results are set forth in Table III below.

TABLE III

| Thickness (inches) | Tensile Strength (psi) | Elongation (%) | Trapezoid Tear (lbs.) |
| --- | --- | --- | --- |
| .115 | 353 | 30 | 6.5 |

Another portion of the mixture containing the blowing agent in a proportion of 2 pph was calendered into a sheet having a thickness of about 0.015 inch and then press-laminated onto a cotton knit fabric and expanded in a circulating hot air oven. The expanded sheeting had good cell structure and satisfactory physical properties.

While the method of the invention has been shown and described in connection with specific embodiments thereof, this is intended for the purpose of illustration rather than limitation, and other variations and modifications thereof will be apparent to those skilled in the art all within the intended spirit and scope of the invention. Accordingly, the patent is not to be limited in scope or effect to the specific forms herein shown and described nor in any other way that is inconsistent with the extent to which the progress in the art has been advanced by the invention.

We claim:
1. In a method of recovering a useable product from scrap cotton fabric backed vinyl sheet by disintegrating the scrap and recovering a vinyl component which can be reused to manufacture a product,
   wherein the improvement comprises milling the scrap cotton fabric backed vinyl in a cooled mill,
   (a) to tear the fabric into fibers having lengths no greater than 0.250 inch; and
   (b) to mix the fibers into the vinyl.

* * * * *